United States Patent [19]

Hagersten

[11] Patent Number: 5,802,566
[45] Date of Patent: Sep. 1, 1998

[54] METHOD AND SYSTEM FOR PREDICTING ADDRESSES AND PREFETCHING DATA INTO A CACHE MEMORY

[75] Inventor: Erik Hagersten, Mountain View, Calif.

[73] Assignee: Sun Microsystems, Inc., Palo Alto, Calif.

[21] Appl. No.: 140,097

[22] PCT Filed: Apr. 29, 1992

[86] PCT No.: PCT/SE92/00282

§ 371 Date: May 2, 1991

§ 102(e) Date: May 2, 1991

[87] PCT Pub. No.: WO92/20027

PCT Pub. Date: Nov. 12, 1992

[30] Foreign Application Priority Data

May 2, 1991 [SE] Sweden ................... 9101325

[51] Int. Cl.$^6$ .................................................. G06F 12/08
[52] U.S. Cl. .................... 711/137; 711/231; 711/217; 711/218
[58] Field of Search .................. 395/425, 375, 395/464, 421.03, 421.07, 421.08, 403, 414, 383, 584, 585, 586, 587; 364/DIG. 1

[56] References Cited

U.S. PATENT DOCUMENTS

| | | | |
|---|---|---|---|
| 4,262,332 | 4/1981 | Bass et al. | 711/114 |
| 4,468,730 | 8/1984 | Dodd et al. | 711/113 |
| 5,093,777 | 3/1992 | Ryan | 711/3 |
| 5,226,130 | 7/1993 | Favor et al. | 395/585 |
| 5,305,389 | 4/1994 | Palmer | 711/137 |
| 5,357,618 | 10/1994 | Mirza et al. | 711/213 |
| 5,367,656 | 11/1994 | Ryan | 711/3 |
| 5,426,764 | 6/1995 | Ryan | 711/137 |

FOREIGN PATENT DOCUMENTS

| | | |
|---|---|---|
| 0402787 | 12/1990 | European Pat. Off. . |
| 0412247 | 2/1991 | European Pat. Off. . |

*Primary Examiner*—Eddie P. Chan
*Assistant Examiner*—Reginald G. Bragdon
*Attorney, Agent, or Firm*—James D. Ivey; Kang S. Lim

[57] ABSTRACT

A Method for increasing data-processing speed in computer systems containing at least one microprocessor (1), a memory device (3), and a cache (2,4) connected to the processor, in which the cache (2,4) is arranged to fetch data from the addresses in the memory device (3) requested by the processor (1) and then also fetches data from one or several addresses in the memory device (3) not requested by the processor (1). The computer system includes a circuit called the stream-detection circuit (5), connected to interact with a cache (2,4) such that the stream-detection circuit (5) detects the addresses which the processor (1) requests in the cache (2,4) and registers whether the addresses requested already existed in cache (2,4). The stream-detection circuit (5) is arranged such that it is made to detect one or several sequential series of addresses requested by the processor (1) in the cache (2,4). Additionally, the stream-detection circuit, upon detection of such a series, is structured to command the cache (2,4) to fetch data from the memory device (3) corresponding to the next address in the series and insert the address in the cache (2,4).

2 Claims, 10 Drawing Sheets

```
PARAMETERS
c_threshold   : How many c_hits are required to create a stream
c_interval    : Array of interesting steps for streams (normally +1 and -1)

Checker Object, C(addr, step, ctr)

addr   : the address to check for
step   : The interval between prefetches
ctr    : How many hits have been recorded
OPERATIONS:
new_c(addr,step,ctr) : Reclaims and initiates a C object. Old C objects are
                       reclaimed by FIFO replacement.
create_c(A) : for(i=1, i<sizeof(c_interval), i++)
              {new_c(A+c_interval[i], c_interval[i],1)}Zstep=c_interval[i].ctr=l
c.snoop(A,op) :
              if (c.addr ==A){
                if (c.ctr > c_threshold)
                  create_x(A, op, c.step)}              %create a stream
```

Fig. 5A

```
        else
            new_c(A+c.step, c.step, c.ctr+1);    %create a new c_obj
            return true}                          %report a hit
        else {return false}
```

Stream Object, S(oaddr,naddr,step)

oaddr  : The address prefetched the longest ago, (old-addr)
naddr  : The address prefetched last (new-addr)
step   : The step to take
OPERATIONS:
new_s(oaddr,naddr,step) : Reclaims and initiates an S object. Old S objects are reclaimed by LRU replacement.

```
create_s(A,op,step):
    {prefetch(op,A+step);                %fetch the next one
     new_s(A+step, A+step,step)          %set up the stream
    }
```

Fig. 5B

```
s.snoop(A.op,cache-hit):
    if (s.oaddr == A){                          %is the stream successful
        if cache-hit{                           %is the prefetching done early
                                                    enough
            prefetch(op, s.naddr + s.step);     %fetch one more
            s.oaddr = s.oaddr + s.step;         %update this stream
            s.naddr = s.naddr + s.step
        }
        else{
            prefetch(op, s.naddr + s.step)      %increase the prefetching
            prefetch(op, s.naddr + 2 * s.step)  %fetch two
            s.oaddr = s.oaddr + s.step
            s.naddr = s.naddr +2 * s.step       %update this stream
        }
        return true                             %report hit
    }
    else {return false}
```

Fig. 5C

THE BUS SNOOPING

```
bus_snoop(A.op, cache-hit):
    forall S {while !(snoop_hit=s.snoop(A.op,cache-hit))}
    if (|cache_hit && |=snoop_hit) {
        forall C {while !(snoop_hit=c.snoop(A))
        if !snoop.hit {create_c(A)}
```

Fig. 5D

| Fig. 5A |
|---------|
| Fig. 5B |
| Fig. 5C |
| Fig. 5D |

METHOD AND SYSTEM FOR PREDICTING ADDRESSES AND PREFETCHING DATA INTO A CACHE MEMORY

BACKGROUND OF THE INVENTION

1. Field of The Invention

This invention relates to a method for increasing the speed of processing data in a computer system.

2. Description of the Related Art

In latter years, progress in VLSI (Very Large Scale Integrated) circuits ha s widened the gap in access times between microprocessors and memory device s. The memory devices are relatively slow compared with the rapid microprocessors in order to narrow this gap in speed, caches have been introduced. These caches are installed between microprocessor and memory device. Caches are relatively small and quick memory devices in the form of chips. In one cache, for example, data that is often used by the microprocessor is stored. The cache fetches its data from a larger memory device, which is slow compared to the cache and the microprocessor. Sometimes, two or several caches are arranged hierarchically between a microprocessor and a large memory device.

Caches can also be found in multiprocessor systems, e.g., where each microprocessor is connected to a cache and where information can be stored into and retrieved from a large memory device by each cache.

An example of the use of this technique is a multiprocessor system in which different processors wore to execute separate sections of a program and in which they therefore must fetch different data from the memory device. When a processor has completed one execution and is about to start a new one, it only needs a fraction of the data stored in the memory device. A processor in this situation first requests the cache for the first piece of data. If the cache does not have this piece of data, it fetches the data from the memory device and stores it in cache. As the processor requests data that is not stored in cache, the data contents of the cache increase. Since the processor is only executing a specific section of the program, the data sought by the processor will be found in cache more often as the execution advances, since the cache has already fetched these data upon previous requests from the processor. The access time for fetching a piece of data from the cache falls considerably short of the access time for the processor to fetch a piece of data straight from the large memory device. The speed of data between memory and processor is thus increased, decreasing the gap between memory-device speed and processor speed, which in turn increases data-processing speed.

Attempts have been made to further increase memory speed with a cache that, when fetching data at an address in the memory device, would simultaneously fetch data at a nearby address in anticipation of the latter being requested by the processor, in which case that piece of data would already be in cache. Another possibility would be to fetch an entire block of data when a single piece is requested. This is advantageous if the data is stored in blocks allowing one to assume that, if the processor requests one address in a block, it will probably request several addresses in the same block. This means that large amounts of unusable data are fetched, however, which is why required caches increase in terms of necessary memory capacity, thus decreasing memory speed.

SUMMARY OF THE INVENTION

The present invention provides a method in which the cache fetches data before the microprocessor requests it, but in which the cache is nonetheless small and thus very quick because the probability is considerably greater that prefetched data will be requested by the processor than it is in other known systems that prefetch data.

The present invention thus relates to a method to increase data-processing speed in computer systems containing at least one microprocessor and a memory device plus a cache connected to the processor, in which the cache is structured to fetch data from the addresses in the memory device that the processor requests and thus also fetch data from one or several addresses in the memory device that the processor has not requested, and is characterized by: a circuit called the stream-detection circuit connected to interact with a cache such that the stream-detection circuit monitors the addresses the processor requests in the cache and registers whether those addresses were already in cache or not; the stream-detection circuit is structured such that it is made to detect one or several sequential series of addresses requested by the processor in the cache; and, the stream-detection circuit, upon detecting such a series, is structured to command the cache to fetch the data from the memory device corresponding to the next address in the series and insert the address in the cache.

BRIEF DESCRIPTION OF THE DRAWINGS

The invention submitted in the application can be generally used in connection with different computer systems and in systems with both individual caches and hierarchically arranged caches. The invention is described in greater detail below, in part in reference to the attached drawings of an embodiment of the invention, of which

DESCRIPTION OF THE PREFERRED EMBODIMENTS

Figure 1:
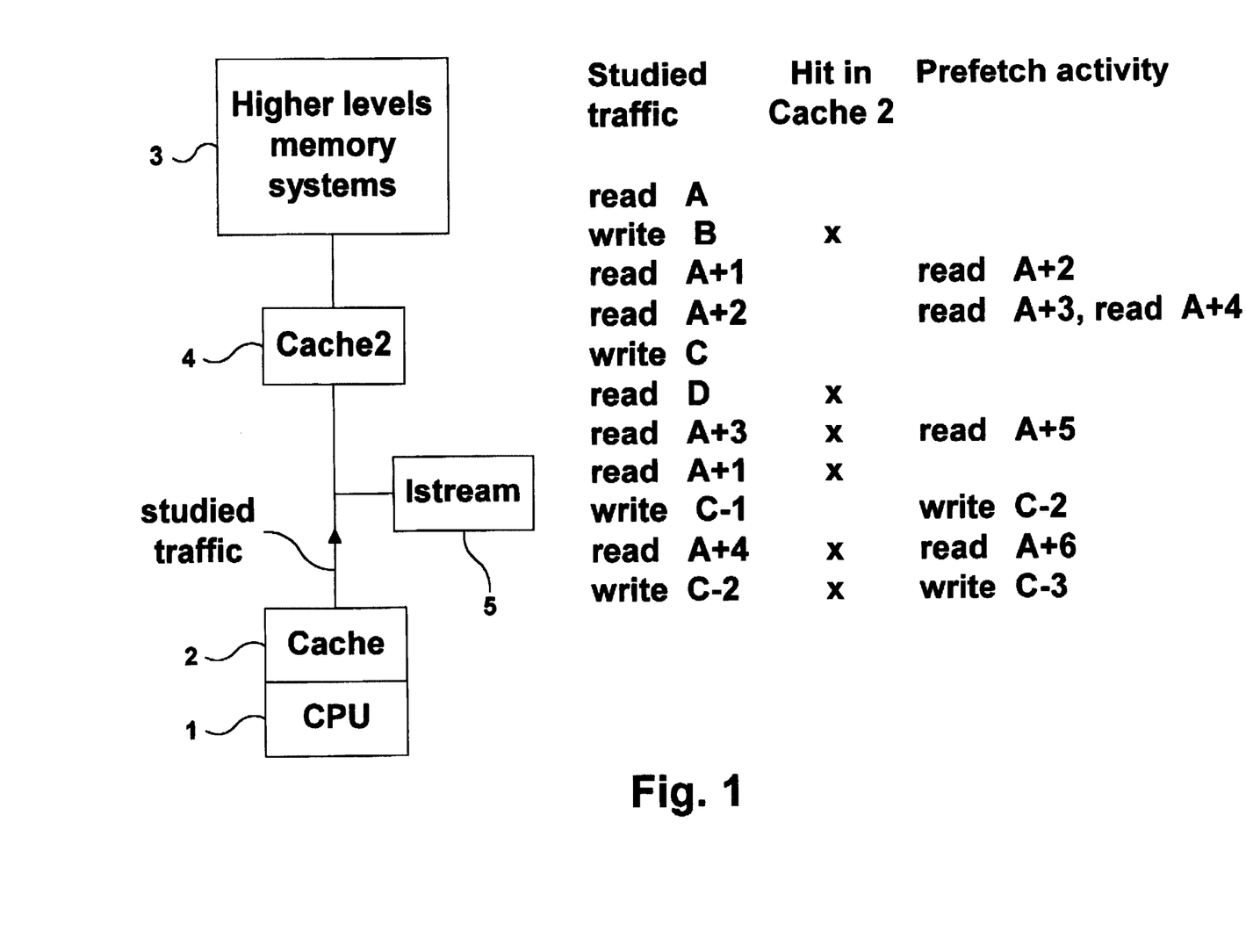
FIG. 1 shows a cache added to a computer and a memory device.

FIG. 1 shows a computer system including a microprocessor 1, to which a cache memory 2 may be attached. Between the microprocessor 1 and memory device 3, another cache memory 4 exists, According to the invention, a stream-detection circuit 5 exists, connected between the microprocessor cache 4 . It is labeled Istream, which stands for Intelligent Stream.

The stream-detection circuit 5 contains stream-object circuits (see FIG. 2) and checker-object circuits. (see FIG. 3)

Figure 3:
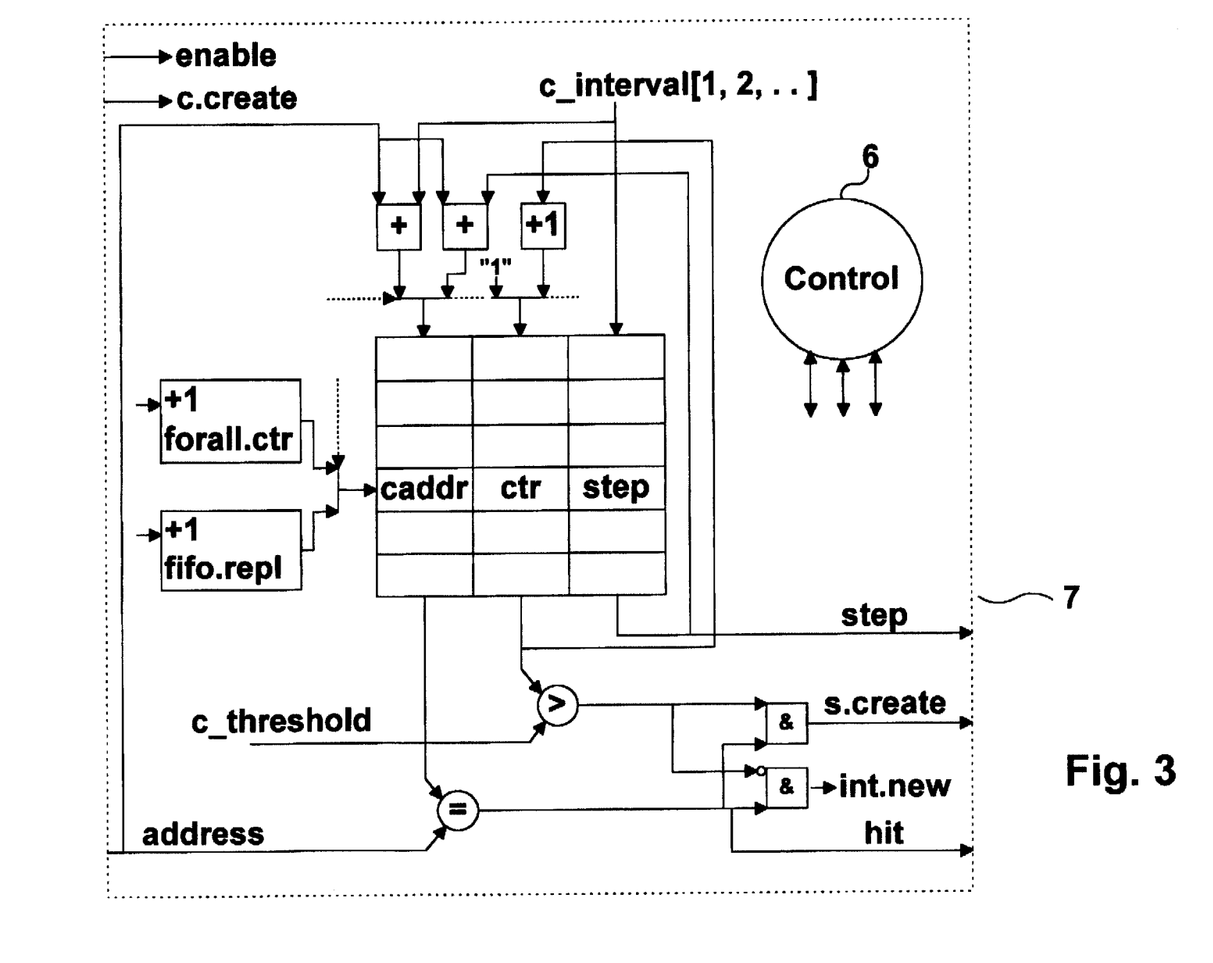
FIG. 3 shows a so-called checker-object circuit.

The task of the checker-object circuit is to detect whether there is a pattern or a sequential series of addresses in the traffic from the processor 1. It achieves this by guessing which addresses memory will be requested based on current addresses and a list of the most commonly occurring intervals between requested addresses, e.g., a list such as (+1, −1, +17). Such a list stimulates the checker-object circuit to, given a request for address A, guess that addresses A+1, A−1, and A+17 will be requested in the future. If a guess at a predetermined pattern turns out to be correct a predetermined number of times, a stream object will be initiated and started.

The stream-object circuit (FIG. 2) contains information about the oldest prefetched address (Oaddr), the most recently fetched address (Naddr), and a function to calculate the next address. An example of such a function is a constant difference between the prefetched addresses (Step), e.g., +1 or −1. The stream-object circuit is arranged so that each request for Oaddr from the processor indicates that the prefetched addresses are usable, stimulating additional prefetching. If a request for Oaddr from the processor results in Oaddr not being in cache—a cache miss—the prefetching has not been done quickly enough, causing more than one address to be prefetched. In those cases in which a request results in the address being in the cache, the prefetching was done in time, so only one additional address was prefetched.

The checker-object circuit (FIG. 3) contains information about an address that is to be checked (Caddr), the previously mentioned step, and a counter (Ctr). Caddr contains one address to be checked or guarded, but generates no prefetching. When the address in Caddr appears between the processor and Cache2, it is checked if Ctr counted to a numerical value equal to the threshold value for whether a stream of addresses shall be considered as having been identified or not. If Ctr does not exceed the threshold value, Caddr is increased by the interval in Step, and Ctr is increased by a numerical value of one.

Figure 2:
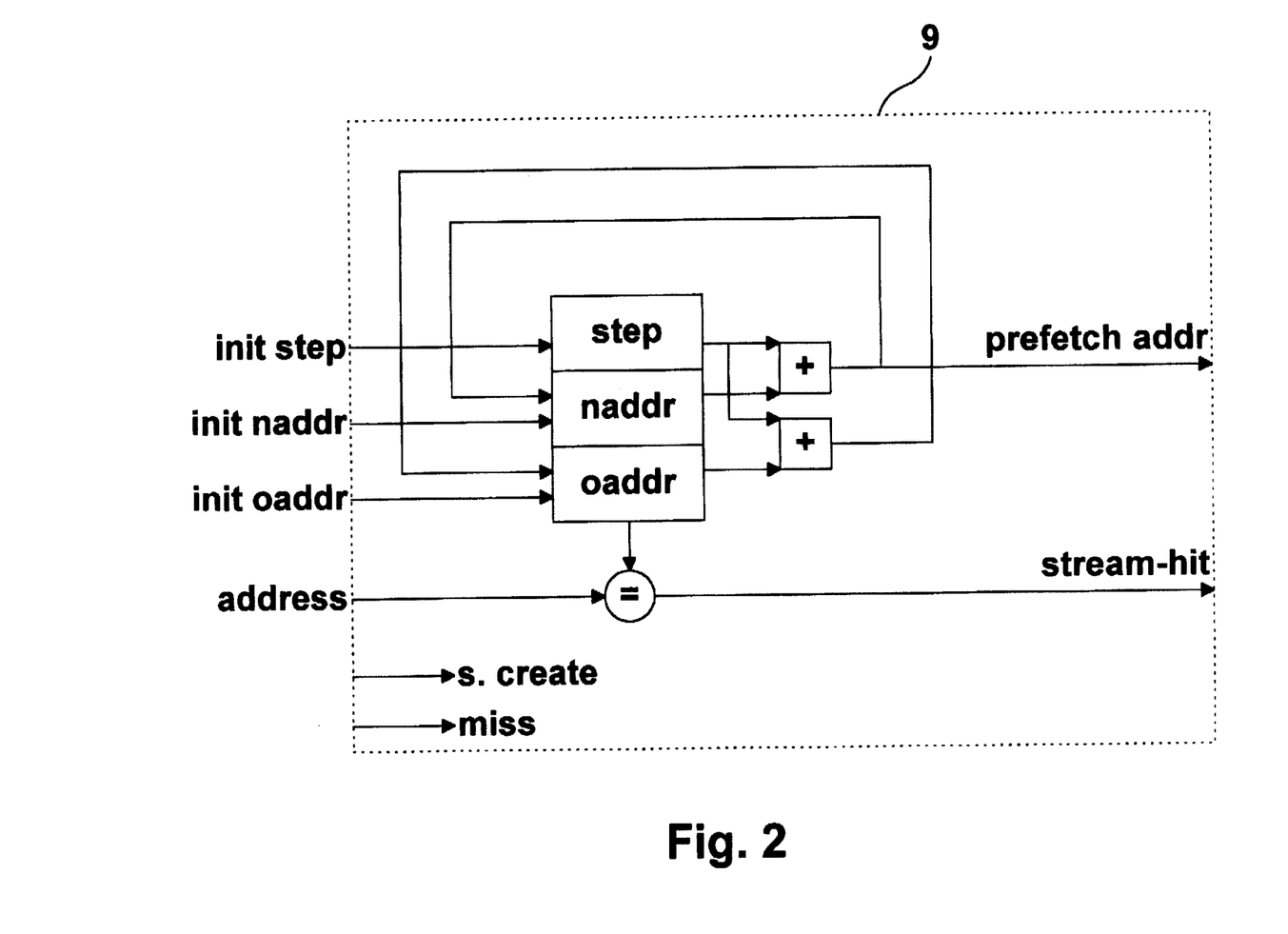
FIG. 2 shows a so-called stream-object circuit.

Thus, the stream-object circuit generates fetching of a stream of data or addresses according to a certain pattern, e.g., nearby addresses such as A+1 and A−1. The pattern can be made simple or complicated depending upon the application.

It is, however, the checker-object circuit that detects whether a stream of data or addresses exists or not. The way the circuit accomplishes this is that when the processor has requested an address in cache that was not in cache, it selects one or several addresses, i.e., the checker objects, which the checker-object circuit shall guard or watch. This selection takes place according to a specific pattern, such as adding a 1 to or subtracting a 1 from the most recently requested address, i.e., select A+1 and A−1. When the checker-object circuit has succeeded in guessing the correct address a certain number of times, a stream of data or addresses is considered to be detected. The number of times is counted and compared with a previously determined numerical value, herein threshold value.

In a presently preferred embodiment, the series can be made up of two or several addresses.

In a special embodiment, the stream-detection circuit can be arranged such that, when the processor requests an address in cache, the stream-detection circuit fetches data from the memory device that corresponds to both the higher and lower order in an assumed series of addresses, until the stream-detection circuit has detected whether the series is increasing or decreasing.

In yet another preferred embodiment, the above-named series which is detectable can be additive, arithmetic, or geometric, or otherwise logically constructed.

In yet another preferred embodiment, new and interesting patterns can be detected upon execution, and thus be added to the list of functions that the checker-object circuit uses to guess addresses for upcoming requested addresses. One example of this is when a new constant interval between the requested addresses starts being used.

It must be noted here that the stream-detection circuit can be constructed, i.e., implemented in hardware (see FIG. 4), in a relatively simple manner as in the example given below; however, the stream-detection circuit can also be entirely composed of software (see FIG. 5), processed by a processor of a suitable known type. Thus, there is no specific hardware implementation here. In the latter case, there are clearly great opportunities for programming the stream-detection circuit, which thereby is a piece of software for detecting various more or less complicated streams of data. One is thereby not limited to, e.g., constant steps between addresses; rather, different series can be detected. For example, a series A+1, A+2, A+4, A+8 . . . A+n or a series A+1, A+2, A+3, A+11, A+12, A+13, A+21, A+22 . . . can be detected.

The present invention is thus not at all limited to the detection of a special configuration of a series that must be detected to be able, by using the detected series, to predict which data in cache will be requested by the processor with a high degree of probability and thus prefetch these data.

In order to prefetch addresses at the appropriate time, which means that prefetched addresses shall have just arrived in cache when they are requested by the processor, the amount of prefetched data is made to increase, in yet another preferred embodiment, until the microprocessor requests an address in the cache where the data has just arrived from the memory device.

Figure 6:
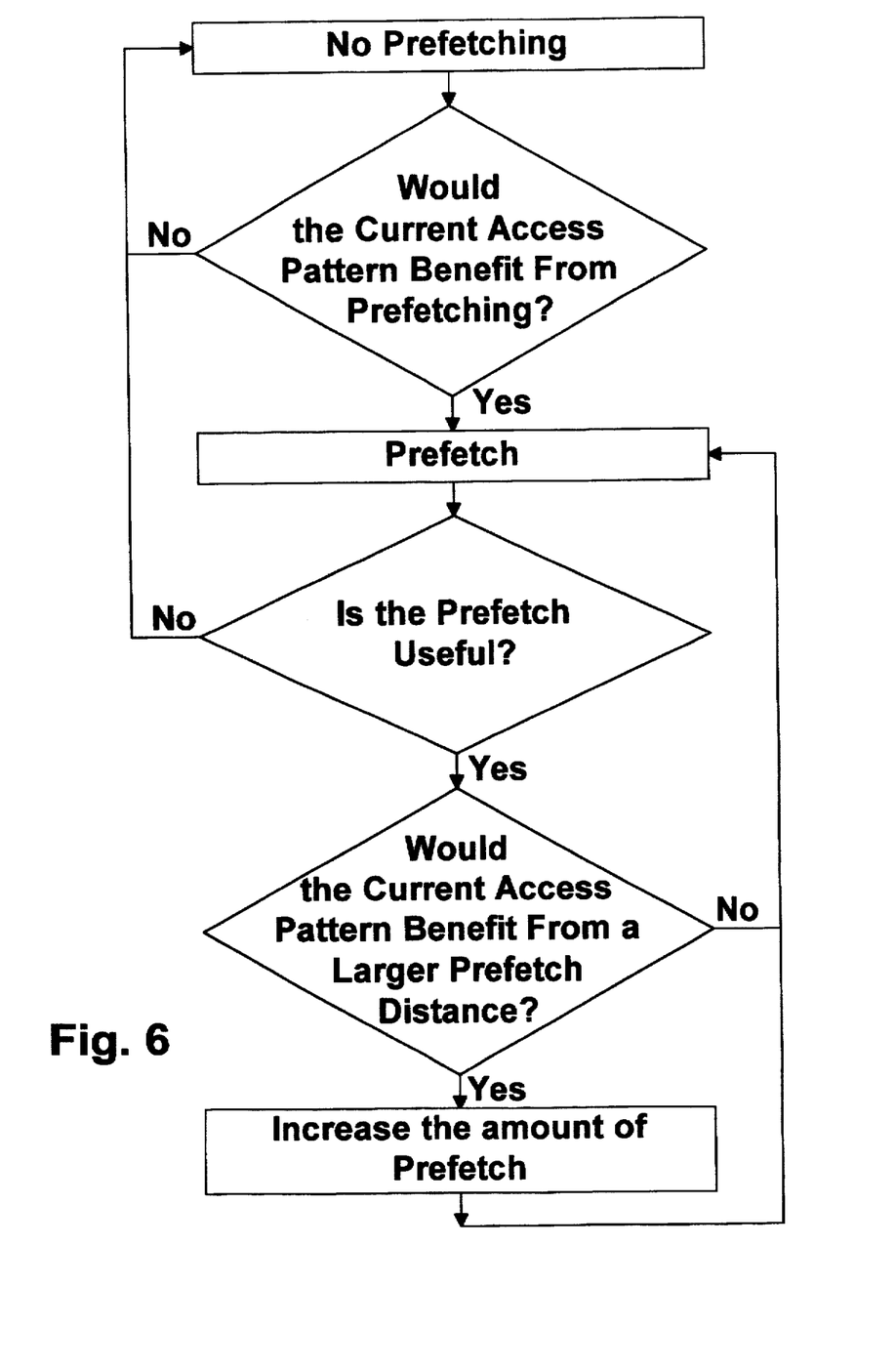
FIG. 6 is a flowchart illustrating the prefetching mechanism of the present invention.

A description follows of how a cache functions in this invention in a simple example illustrating an algorithm for the stream-detection circuit's function together with a cache as illustrated by the flowchart of FIG. 6. This is exemplified in FIG. 1, to the right of which a table is shown displaying: the traffic between the processor and Cache 4, whether a cache hit occurs, and the activity of prefetching addresses. The simple stream-detection circuit in the example below includes two checker-object-circuits and four stream-object circuits. The interval Step is set at +1 and −1. In the example, the threshold value for the discovery of a stream is set at the numerical value of one, i.e., a stream is created immediately when a checker object agrees with an address in Cache 2 requested by the processor.

These activities are described line-by-line below according to the column in FIG. 1 headed "Studied traffic."

In the column headed "Studied traffic" and the column headed "Prefetch Activity," "read" and "write" appear. This means that the prefetched data to the cache are prefetched in"read" or "write" mode. This has great significance when the invention is implemented with a multiprocessor.

read A—The request from the processor for address A in the cache results in a miss in cache 2, i.e., the address was not in cache 2. Cache 2 then fetches A from memory device 3. Address A is compared with all Oaddr, which currently contains no addresses, resulting in no agreement. So-called checker objects C(A−1) and C(A+1) are then formed.

write B—This results in a cache hit, given that address B already exists in cache 2. Address B is compared with all Oaddr, which currently contains no addresses.

read A+1—A miss in cache 2 causes cache 2 to fetch A+1. Address A+1 is compared with the two checker objects C(A−1) and C(A+1), which results in an agreement with A+1. A stream is created with Naddr=A+2 and Oaddr A+2 and Step=1. Stream-detection circuit 5 forces cache 2 to prefetch A+2.

read A+2—a miss in cache 2 causes cache 2 to fetch A+2. However, exactly this fetch was initiated in the previous step, read A+1, but A+2 has not yet had time to arrive in cache 2. A+2 is compared with all Oaddr, which results in an agreement. This causes the stream-detection circuit to force cache 2 to prefetch two addresses, i.e., A+3 and A+4 to increase prefetching preparedness. Oaddr is changed to A+3 and Naddr is changed to A+4.

write C—The request results in a miss in cache 2. The stream-detection circuit forces cache 2 to fetch C. Address C is compared with all Oaddr (A+3), which does not lead to any agreement. Address C is compared also with the two checker objects (A+1 and A+2), but they do not agree either. Two new checker objects are then created, i.e., C(C+1) and C(C−1).

read D—This results in a hit in cache 2, given that address D already existed in cache 2. Address D is compared with all Oaddr (A+3), which does not result in any agreement.

read A+3—This results in a hit in cache 2. The address is compared with all Oaddr (A+3), which results in an agreement. Oaddr is then changed to A+4, Naddr to A+5. Furthermore, the stream-detection circuit forces cache 2 to prefetch A+5 with a read instruction (A+5).

read A+1—This results in a hit in cache 2. The A+1 address is compared with all Oaddr (A+4), which does not result in any agreement. Nothing more happens.

write C−1—This results in a miss in cache 2. Address C−1 is compared with all Oaddr (A+4), which does not result in any agreement. C−1 is compared with all checker objects (A+1, A−1, C+1, and C−1), which results in a hit. A stream with Naddr=C−2, oaddr C−2, and Step=−1 is then initiated. Furthermore, address C−2 is prefetched with a write instruction ( C−2).

read A+4 —This results in a hit in cache 2. Address A+4 is compared with all Oaddr, i.e. (A+4) and ( C−2), which results in an agreement on C−2. Oaddr is changed to A+5, Naddr is changed to A+6, and address A+6 is prefetched with the read instruction (A+6).

write C−2—This results in a hit in cache 2. Address C−2 is compared with all Oaddr (A+5 and C−2), which results in an agreement. Oaddr is then changed to C−3 and Naddr to C−3. Address C−3 is prefetched with the write instruction (C−3).

The algorithm described above is specially suited for implementation in hardware. It is furthermore especially suited for prefetching addresses to a second-level cache. Most requests from a processor result in a cache hit. When a cache hit occurs, only one comparison per stream object is necessary. When a cache miss occurs, i.e., when that which was requested is not in cache, comparisons per stream object and per checker object are required.

Figure 5:
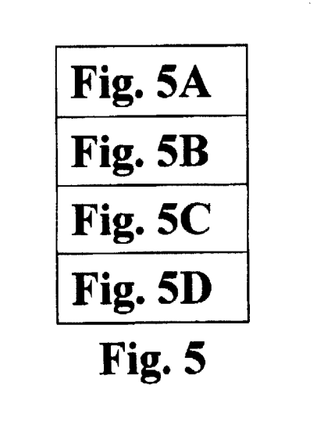
FIG. 5 is an informal specification of a simplified stream-detection circuit in a software implementation.
Figure 5A:
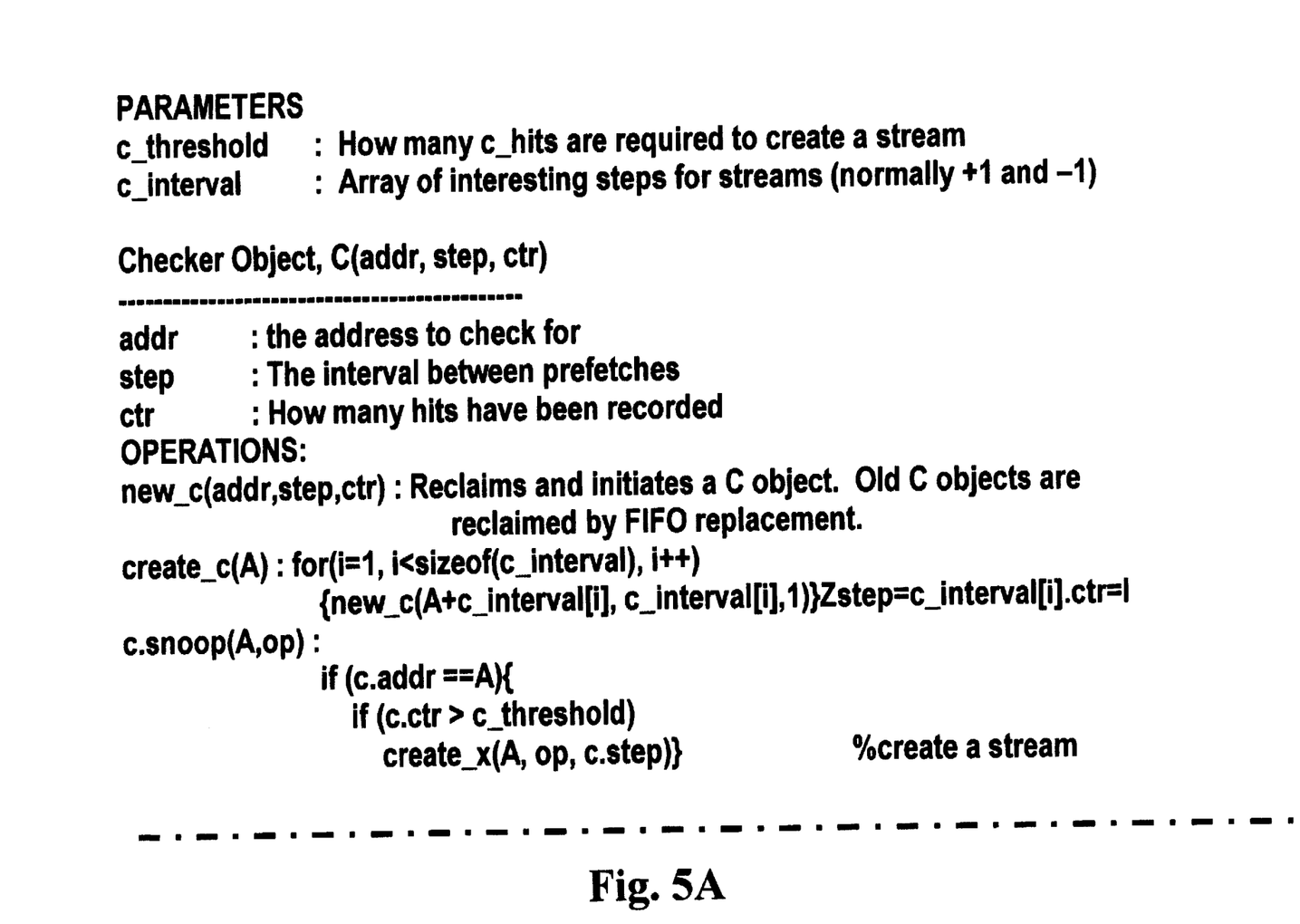
Figure 5B:
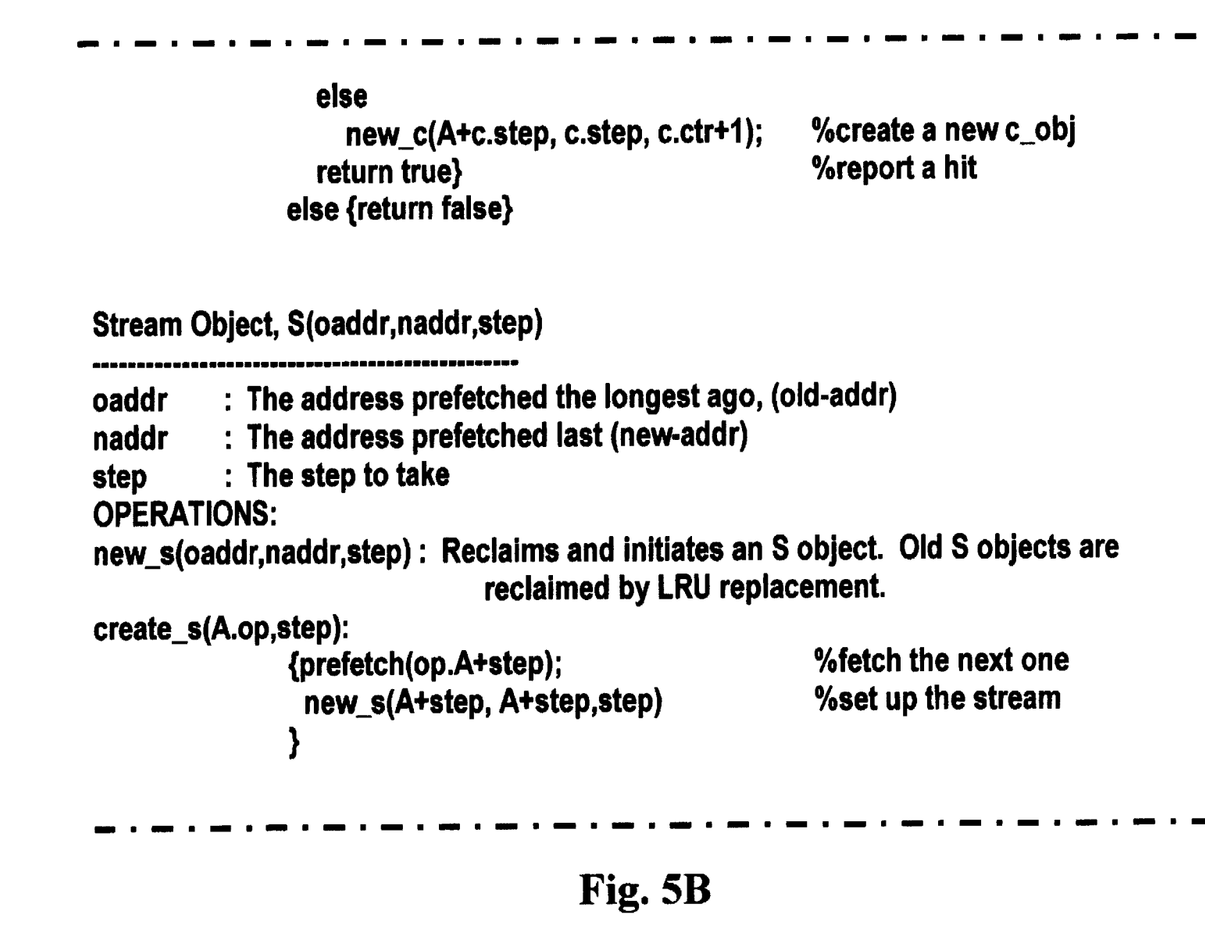
Figure 5C:
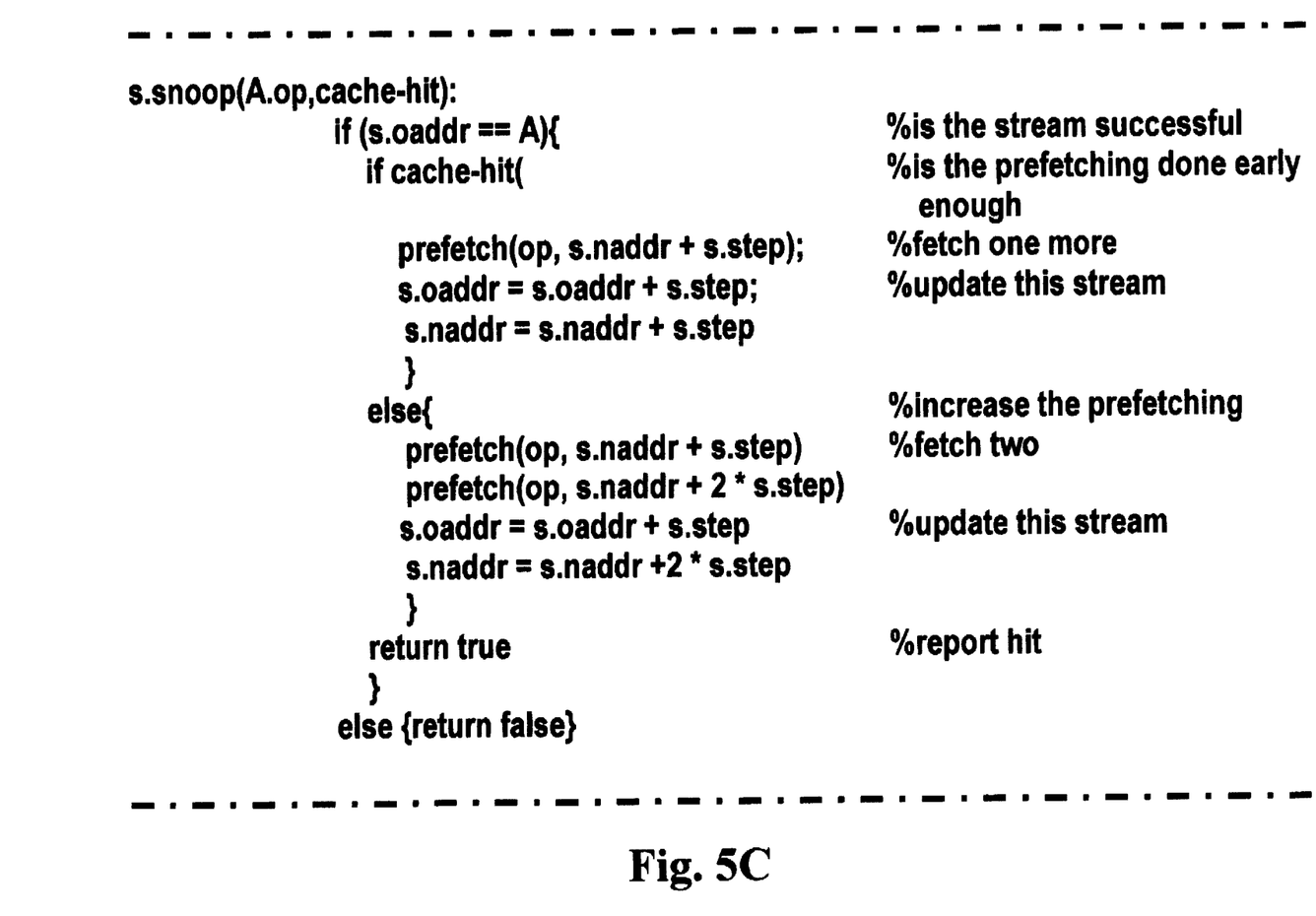
Figure 5D:
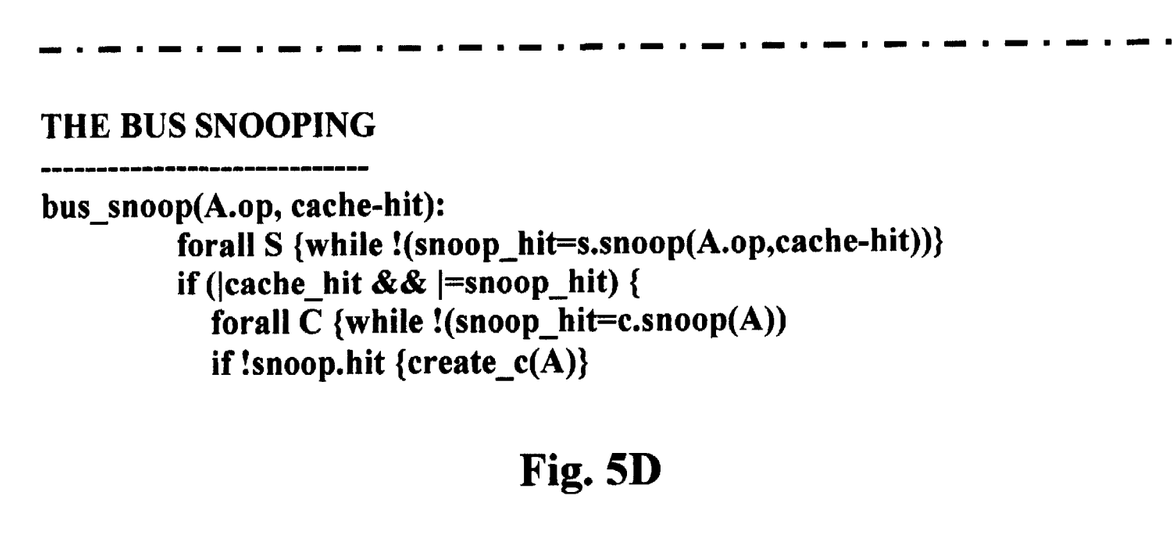

FIG. 5 shows an informal specification of a simple stream-detection circuit implemented in software. Shown in FIG. 5 is the structure that the software would take in a simple case. One skilled in the art may nonetheless wish to use this structure with a more complicated stream-detection circuit implemented in software.

The following description is an example of an implementation of the stream-detection circuit in hardware according to the invention. The implementation is described in connection with three figures, FIG. 2 showing a stream-object circuit, FIG. 3 showing a checker-object circuit, and FIG. 4 showing a stream-detection circuit including checker-object and stream-object circuits.

Figures 4, 4B:
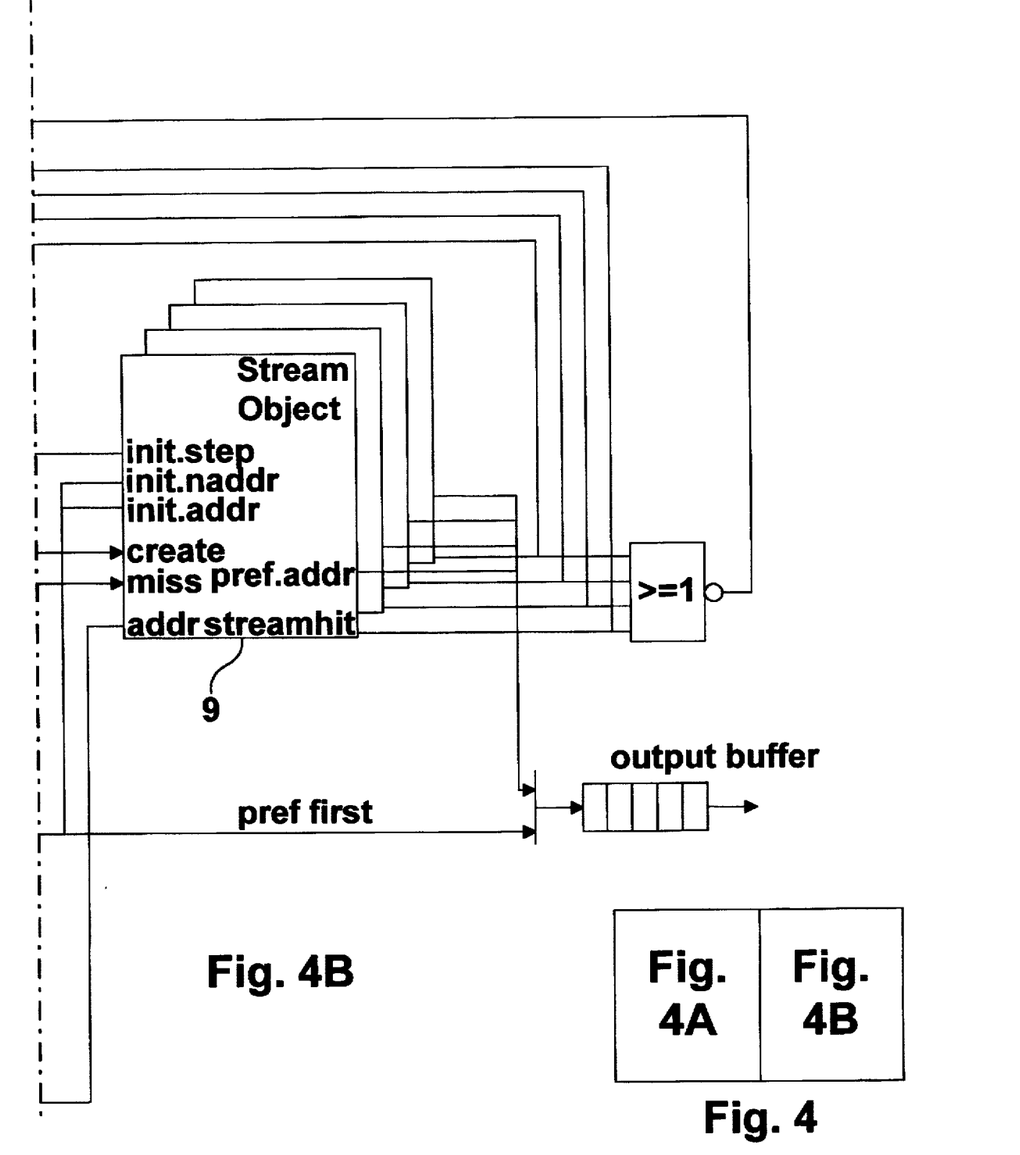
FIG. 4 shows a stream-detection circuit.
Figure 4A:
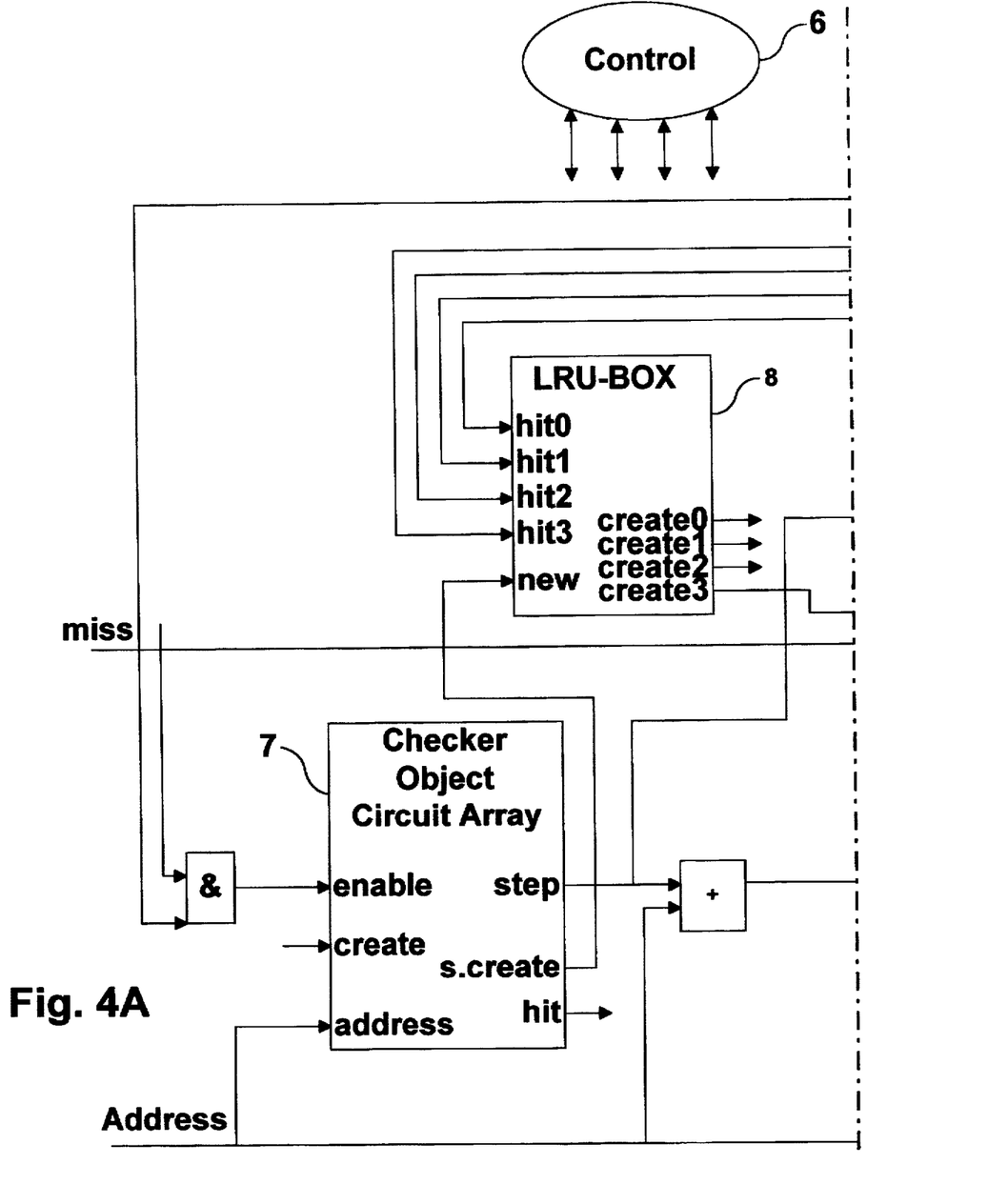

In FIGS. 3 and 4, the "Control" symbol represents the logic that directs the flow of data and data paths in execution.

FIG. 4 shows the high-level structure for the data paths of a stream-detection circuit. The input signal,"Address," contains the address requested by a processor from the cache, while the input signal "miss" indicates whether that which was requested is in cache or not.

The "checker-array" block 7 is assumed to contain several checker objects. The purpose of the block 7 is to discover new patterns in the requests from the processor, and is activated with the "enable" signal when a miss in cache has been detected in combination with a request not being included in an already active stream.

When new requests according to any pattern are detected, an "s.create" signal is sent to an LRU-BOX block 8. The LRU box 8 has the task of selecting the stream object that has been inactive the longest. To determine this, each stream object sends a signal each time it is active (hit0, hit1, hit2, and hit3). The LRU box 8 initiates a selected stream object by sending the signal to the selected stream object (create0, create1, create2 and, create3).

The initial address value (init.addr) of the selected stream object activated with its "create" signal is calculated as the sum of the present request's address and the steps of the detected pattern. This address is also sent for prefetching to the "output buffer." The steps of the pattern are also sent to initialize a stream object (init.step).

The input signals "address" and "miss" are sent to all stream objects, which use them to check active streams. The stream object sends new addresses to be prefetched to the "output buffer."

In FIG. 2, a stream-object circuit is shown. The circuit contains three registers, i.e., step, naddr, and oaddr. The registers are initiated when an input signal labeled create is active, which causes the signals "init step" (initial step), "init naddr" (initial new address), and "init oaddr" (initial old address) to be written to each register. When the input signal s-create is not active, the content of oaddr will be compared with the "address" signal, which is the address that is momentarily being requested by the processor. If agreement is detected, an output signal "stream-hit" is produced, which indicates that a previously prefetched address is now being requested. The output signal "prefetch-addr" is created by adding naddr and step. If stream-hit is active, a data path, which calculates the prefetching address (prefetch-addr) by adding step and oaddr, will be activated. The Naddr register will also be updated with prefetch-addr. If the "miss" input signal is active, the data path that adds step and naddr in order to produce a new naddr will be activated twice, and an additional prefetching address (prefetch addr) will be created.

In FIG. 3, a checker-object circuit, which contains an array of checker-object circuits, is shown. The input signals are the address that shall be checked (address), an activation signal (enable), and the above-named create signal. The output signals are step, a signal to create a stream (s.create), and the "hit" signal, which states that a prefetched address has been detected. FIG. 3 shows an array of checker-object circuits, each of which contain three registers, i.e., caddr (address to be checked), ctr (which contains a numerical value to check whether the threshold value mentioned earlier has been reached or not), and step. One object is selected by means of either the "forall.ctr" or the "fifo.repl" register.

If the "enable" input signal is active, a check is carried out. The counter forall.ctr steps through the entire array each time an address is to be checked. The content of the caddr register of the selected object is compared with the incoming address. The content of ctr in the selected object is compared with the constant numerical value c-threshold, i.e., the threshold value. The content of the step register of the selected object is output as a "step" output signal. The combination of the selected caddr being the same as the incoming address and the content of the selected ctr being greater than the threshold value in the c-threshold generates the s.create output signal. The combination of the selected caddr being the same as the incoming address and the ctr not being greater than the threshold value in the c-threshold generates the output signal int.inc (internal increment).

The int.inc signal activates a data path, which increases the numerical value in the selected ctr and enters the new numerical value into the ctr register. The int.inc signal also activates a data path, which adds the selected step to the incoming address and writes the result into the caddr register.

The "hit" output signal reports that it has detected an agreement regarding the addresses between a caddr (address being checked) and an incoming address.

When the input signal create is active, the contents of fifo.repl will select the object. The caddr of the register thus selected will be set at the incoming address plus the first value on a list of values labeled c-interval; its ctr will be set at 1 and its step set at the first value in the c-interval list. Then the fifo.repl register will be incremented and used to carry out the same work for the second value on the c-interval list. This procedure will be repeated until such time as all the values on the c-interval list have been used.

In FIG. 4, a stream-detection circuit is shown that includes an array of checker-object circuits 7 and several stream-object circuits. The incoming address is sent to a stream-object circuit 9 and to the array of checker-object circuits. The incoming address reports whether the address generated a miss in cache. The address for the data that shall be prefetched is reported as an output signal in an output register labeled "output buffer."

If there is no hit—i.e., no agreement—in the stream-object circuit in combination with a miss in cache, the checker object circuit array 7 will be activated. If the activated checker object circuit array 7 does not create a hit, new checker objects—i.e., addresses to be checked—will be created by the signal "s.create" sent to the checker array.

A hit in the checker object circuit array 7 —i.e., the address was expected—is shown with the "hit" output signal. The "s.create" output signal reports that there was a hit and that the threshold value to create a stream was also exceeded. The s.create signal is sent to a LRU (least recently used) box 8, which sends a create signal to the next stream-object circuit to be initiated. The LRU box selects the stream-object circuit 9 that was inactive longest. The selected stream-object circuit 7 receives its init.step signal from the checker object circuit array 7, its init.addr and init.oaddr from the sum of step plus the address currently being requested by the processor.

Simultaneously with the initiation of a stream-object circuit, the first piece of data is being prefetched. When a stream is detected, the address of the data that is to be prefetched is sent to the register output buffer. More than one address can be prefetched when a stream is detected.

The Implementation depends on the numbers addresses and transfer speed between processor and cache.

The stream-detection circuit 8 can be implemented as a separate functional unit connected to the bus that runs between the processor and cache, or alternatively as an integrated part of the cache. The difference depends on the destination of stream-detection circuit commands issued to prefetch addresses.

In a separate unit, the stream-detection circuit issues commands on the bus as any other arrangement connected to the bus. Examples of suitable buses are Motorola Mbus and Futurebus+.

Integrating the stream-detection circuit into a cache has the advantage of not generating extra traffic on the bus to the cache.

An embodiment of the cache described above is well suited to several areas of application.

One area is when the requests are strictly sequential, such as when searching arrays or files. Another is loops requesting large arrays, in which each element comes up several times and then is never used again. Another area is scientific computing, such as matrix calculations. In, for example, matrix multiplication, three streams are generated. Reading from the first matrix and then writing to the result matrix generates streams of one step with the numerical value of one, whereas reading the other operand results in a step with a numerical value equal to the number of columns.

Another area is the creation of stacks which grow slowly.

The greatest use for stream-detection circuits should be in the startup stage, i.e., a cold start, or immediately after processors have been joined or reconnected to other processors.

A number of applications have been described above. This invention can be modified, however, to differ from the embodiments disclose without straying from the basic idea behind the invention, i.e., to detect a stream of data or addresses and utilize the detected stream to predict coming requests for data or addresses and then prefetch them.

This invention shall therefore not be considered as limited to the exemplary embodiments described above; rather, it may be modified within the spirit and scope of the appended claims.

I claim:

1. A prefetching apparatus useful in association with a computer system having at least one processor, a memory device, and a cache memory coupled to said at least one processor, said apparatus comprising:

a stream-detector configured to compare a requested memory address associated with data requested by said at least one processor to a predicted memory address derived from a previously requested memory address according to each of at least one memory address pattern; and a prefetcher configured to prefetch new data from the memory device and to store said data in the cache memory, said new data prefetched from a next memory address computed from said requested memory address and a corresponding one of the at least one memory address pattern upon a condition in which the requested memory address is accurately represented by the predicted memory address of the corresponding memory address pattern, said new data prefetched in anticipation of a request for said new data from said at least one processor;

wherein upon the condition that there is a cache hit for the requested data in the cache memory, N new data is prefetched, where N is at least 1 and upon the condition that there is a cache miss for the requested data in the cache memory, M new data is prefetched, where M is greater than N.

2. A method for increasing data-processing speed in a computer system having at least one processor, a memory device, and a cache memory coupled to said at least one processor, said method comprising the steps of:

predicting a predicted memory address from a previously requested memory address according to each of at least one memory address pattern;

comparing a requested memory address associated with data requested by the at least one processor to the predicted memory address of the at least one memory address pattern; and upon a condition in which the requested memory address is accurately represented by the predicted memory address of a corresponding one of the at least one memory address pattern:

computing a next memory address from said requested memory address and the corresponding memory address pattern; and prefetching new data from the memory device and storing said new data in the cache memory, said new data prefetched from the computed next memory address in anticipation of a request for said new data from said at least one processor;

wherein upon the condition that there is a cache hit for the requested data in the cache memory, N new data is prefetched, where N is at least 1 and upon the condition that there is a cache miss for the requested data in the cache memory, M new data is prefetched, where M is greater than N.

* * * * *